United States Patent
Hymes

(10) Patent No.: US 9,066,496 B2
(45) Date of Patent: Jun. 30, 2015

(54) AUTOMATIC SMART WATERING APPARATUS

(76) Inventor: Ron Hymes, San Juan Capistrano, CA (US)

(*) Notice: Subject to any disclaimer, the term of this patent is extended or adjusted under 35 U.S.C. 154(b) by 555 days.

(21) Appl. No.: 13/334,005

(22) Filed: Dec. 21, 2011

(65) Prior Publication Data

US 2012/0152374 A1 Jun. 21, 2012

Related U.S. Application Data

(63) Continuation-in-part of application No. 11/977,194, filed on Oct. 24, 2007, now abandoned.

(60) Provisional application No. 60/862,714, filed on Oct. 24, 2006.

(51) Int. Cl.
*F16K 31/48* (2006.01)
*A01K 7/02* (2006.01)

(52) U.S. Cl.
CPC .......................................... *A01K 7/02* (2013.01)

(58) Field of Classification Search
CPC ........... A01K 5/02; A01K 5/029; A01K 7/00; A01K 7/02; A01K 7/005; A01K 39/02; A01K 39/04; G05D 9/00; G05D 9/02; G05D 9/04; G05D 9/12
USPC ........................ 137/392, 624.12; 119/74, 77
See application file for complete search history.

(56) References Cited

U.S. PATENT DOCUMENTS

| | | | |
|---|---|---|---|
| 399,418 A | 3/1889 | Langdon | |
| 1,346,898 A | 7/1920 | Kingsbury | |
| 2,632,308 A * | 3/1953 | Engelhardt | 62/139 |
| 2,766,406 A * | 10/1956 | Jerome | 361/165 |
| 2,791,984 A * | 5/1957 | Franklin | 119/51.12 |
| 2,824,278 A * | 2/1958 | Johnston | 73/295 |
| 2,924,234 A * | 2/1960 | Wilson | 137/392 |
| 3,339,578 A * | 9/1967 | Smith | 137/392 |
| 3,547,145 A * | 12/1970 | Holzer | 137/392 |
| 3,741,683 A * | 6/1973 | McTamaney et al. | 417/7 |
| 3,916,213 A * | 10/1975 | Luteran | 307/118 |
| 4,265,262 A * | 5/1981 | Hotine | 137/2 |
| 4,295,793 A * | 10/1981 | McGalliard | 417/36 |
| 4,480,901 A * | 11/1984 | Osegowitsch et al. | 396/617 |
| 4,612,949 A * | 9/1986 | Henson | 137/2 |
| 5,038,820 A | 8/1991 | Ames et al. | |
| 5,231,953 A * | 8/1993 | Garrett | 119/61.52 |
| 5,904,169 A * | 5/1999 | Yoshitani | 137/392 |
| 6,055,934 A * | 5/2000 | Burns et al. | 119/74 |
| 6,463,880 B1 * | 10/2002 | Callingham | 119/78 |
| 6,612,812 B1 * | 9/2003 | Gard | 417/12 |
| 6,877,170 B1 | 4/2005 | Quintana et al. | |
| 6,926,028 B2 | 8/2005 | Murray et al. | |
| 7,328,671 B2 * | 2/2008 | Kates | 119/720 |
| 2003/0213437 A1 * | 11/2003 | Norris | 119/74 |
| 2005/0241589 A1 | 11/2005 | Forster | |

\* cited by examiner

*Primary Examiner* — Craig Schneider
*Assistant Examiner* — Craig J Price
(74) *Attorney, Agent, or Firm* — Wagenknecht IP Law Group PC

(57) ABSTRACT

The present invention provides a smart water flow apparatus capable of maintaining a desired level of water in a reservoir while having an override or shutoff feature that is programmable to address variations in water pressure or to prevent flooding.

20 Claims, 8 Drawing Sheets

AUTOMATIC SMART WATERING APPARATUS

CROSS-REFERENCE TO RELATED APPLICATIONS

The present application is a continuation-in-part of U.S. patent application Ser. No. 11/977,194, filed Oct. 24, 2007, now abandoned which claims benefit of priority to U.S. provisional patent application Ser. No. 60/862,714 filed on Oct. 24, 2006; each of which are incorporated by reference in their entirety.

FIELD OF THE INVENTION

The inventions disclosed herein relate to apparatuses, systems and methods for regulating the flow of a fluid to one or more reservoirs and thus maintaining a desired level of fluid in each such reservoir. More specifically the inventions disclosed herein refer to smart water flow apparatuses, components, systems and methods that all allow a desired level of fluid to be maintained within the reservoir while including a programmable override or shutoff feature should the device be toppled or malfunction.

BACKGROUND OF THE INVENTION

A variety of products currently exist on the market for providing drinking water for pets. Typically, pet owners provide a supply of drinking water to their pets by filling a reservoir, such as a bowl, with water and leaving the reservoir in a spot accessible by the pet. Once the pet consumes the entire contents of the reservoir, the reservoir needs to be manually refilled with water. The drawback of such products is that they require frequent, typically daily, replenishment by the owner. This presents a problem for owners who must leave their pets alone for periods of time.

Certain devices attempt to solve the above problem by providing alternative means for refilling the drinking water reservoir. For example, U.S. Pat. No. 6,971,331 issued to Rohrer, teaches water dispensing device comprising an open reservoir connected to a closed reservoir placed on top of the open reservoir, so that by force of gravity the water in the closed reservoir flows to and refills the open reservoir. A similar principle of gravity flow from a higher closed reservoir to a lower open reservoir is utilized in a device disclosed in U.S. Pat. No. 6,843,205 issued to Segreto. Such gravity flow devices have a number of important drawbacks. First, the continuous water flow lasts only as long as the top closed reservoir contains water. Therefore, such devices are typically large, heavy, and cumbersome, since they incorporate a large water container sitting on top of the lower open reservoir. Unless mounted to a wall or otherwise properly supported, such devices risk being overturned by and hurting the pet. Moreover, the gravity flow design does not eliminate the need to consistently refill the reservoir, it simply prolongs the time between refills. Once the top reservoir is depleted, so is the supply of water and the owner needs to refill the top reservoir in order to continue the water flow.

Other devices provide a reservoir which is connected to a continuous supply of water. Such devices use mechanical flow valves similar to those found in toilet tanks to regulate the flow of water from the source to the reservoir. One major drawback of such devices it that the flow valves are prone to failure, resulting in water overflow. Likewise, overflow results when a pet overturns the reservoir, since the water continues to flow even once the device is not in a horizontal position.

SUMMARY OF THE INVENTION

The present invention addresses the shortcomings of current water flow devices and provides related benefits. More specifically the present invention discloses a smart water flow apparatus capable of maintaining a desired level of fluid while incorporating shutoff features or overrides should the apparatus malfunction or should the apparatus be tipped over. The apparatus of the present invention is adaptable to a variety of water pressures and because of its shutoff or override capabilities may be used indoors or in a variety of situations without concern of significant flooding. Moreover, the present invention may be adapted to various flow rates should the water pressure from the primary source change such as during times of higher or lesser water pressure.

In one aspect of the present invention a smart water flow apparatus is provided including a reservoir capable of retaining a fluid, a sensor means capable of detecting the presence or absence of a fluid, a continuous water supply line in fluid connection or capable of fluid connection to a continuous water supply, a valve means capable of regulating the flow of water or a fluid through the continuous water supply line, and a microcontroller operably connected to a power source. The microcontroller is also operably connected to the sensor means and the valve means and can instruct the valve means to open or close in response to electrical signal from the sensor means. The microcontroller further includes a self programmable timing means capable of timing the flow of fluid permitting the microcontroller to measure and store in memory an initial flow time as a programmed fill time (also referred to as an auto learned time) and a subsequent flow time as a subsequent fill time. The microcontroller instructs the closure of the valve means if the subsequent fill time equals or exceeds the programmed fill time thereby providing a redundant shut off or override feature.

In a second aspect of the present invention a smart water flow system is provided included a plurality of reservoirs, each having a sensor means positioned along the inner side wall or reservoir cavity, a microcontroller, a continuous water supply line and a series of water lines coupled thereto, a valve means capable of regulating flow of fluid into each of the reservoirs independently via the series of water supply lines, and a power supply.

In a third aspect of the present invention a smart water flow kit is provided including the smart water flow apparatus of the present invention, an installation means for installing the apparatus to a continuous water source and instructions for such assembly.

In a fourth aspect of the invention, software loaded in the apparatus is provided, which is capable of monitoring stop, start and reference sensors, measuring and storing an initial flow time and one or more subsequent fill times, comparing times and instructing closure of the valve means if the subsequent fill time equals or exceeds the initial flow time. The loaded software can also include a default fill time and instruct activation of one or more visual indicators.

DETAILED DESCRIPTION OF THE INVENTION

The present invention includes a variety of smart flow systems that ensure appropriate delivery of fluid such as water to pets, livestock and the like. In essence, the smart flow apparatus 10 of the present invention allows the monitoring of a fluid level in a reservoir 12 and automatically delivers additional fluid when depleted or sufficiently decreased. Since the apparatus 10 is connected or coupled to a continuous water or fluid source, the user is not required to refill reservoirs or supply containers. In addition, an override or shutoff feature is provided to prevent spillage should the reservoir 12 be overturned or should a sensor 14 fail. Thus, the apparatus 10 and methods of the present invention operate by detecting the presence or absence of fluid at one or more desired levels and regulating fluid flow in response to the fluid level. Since the apparatus 10 of the present invention is a smart system, the apparatus 10 may be programmed for a variety of water pressures, reservoir volumes and the like.

As will be recognized, the apparatus 10 of the present invention may be provided in a variety of embodiments depending on the particular needs of the user. If developed for home use, the apparatus 10 can be provided as a continuous watering bowl for a pet. In these embodiments, the apparatus 10 ensures the pet's watering bowl is sufficiently filled with water at all times, yet provides a shut off feature for instances such as if the pet overturns the reservoir 12. Thus, the apparatus 10 may be used indoors without significant concern of flooding.

Figure 6:
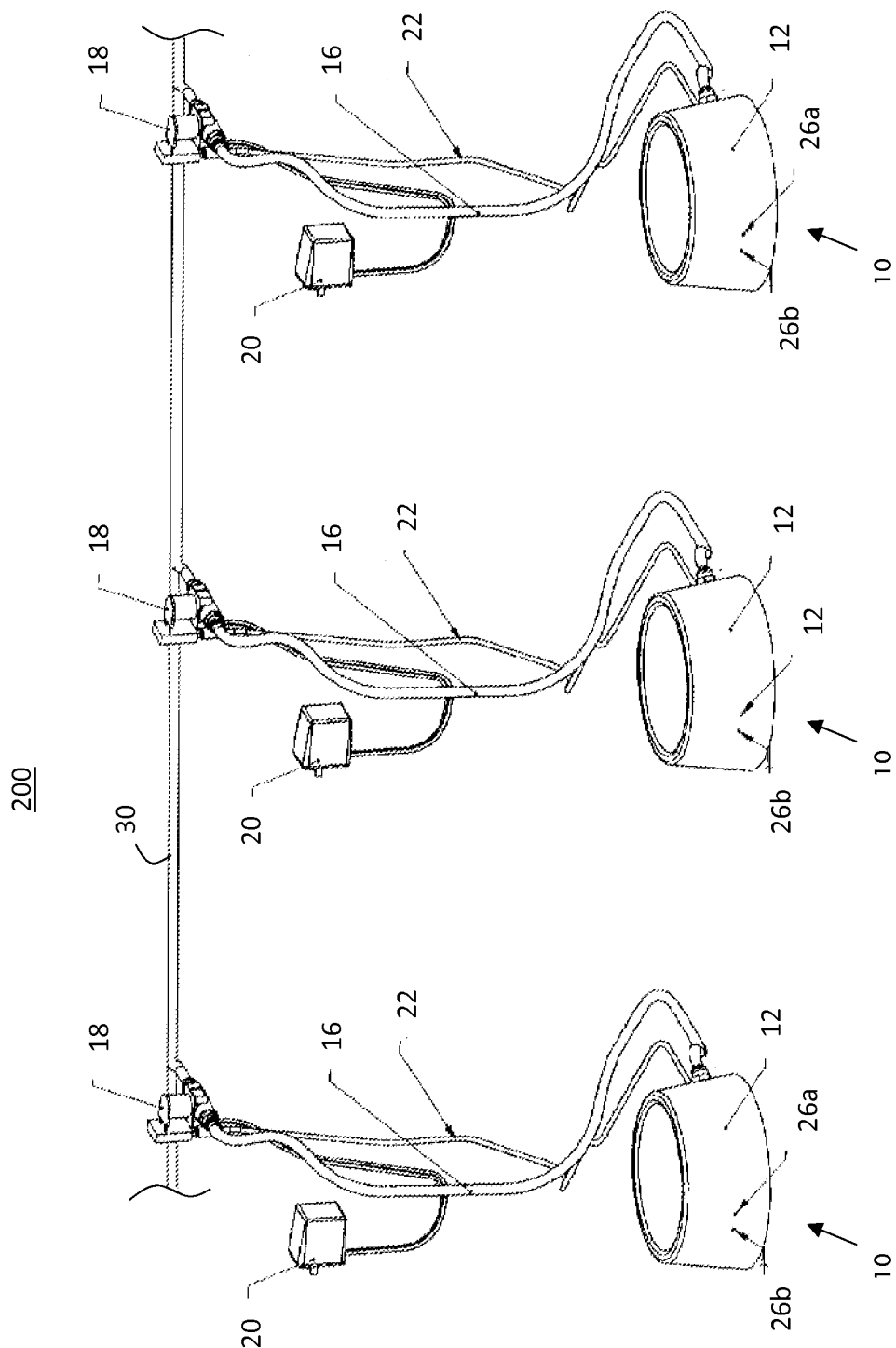
FIG. 6 depicts a smart water flow system 200, which incorporated a plurality of open top reservoirs 10 from a plurality of smart water flow apparatuses 10.

When used with veterinary or livestock situations, the smart flow apparatus 10 of the present invention has addition utilities which deliver water or fluid to one or more of a variety of water bowls, containers, troughs and the like. Thus, as depicted in FIG. 6 and taken together with FIG. 2, each reservoir 12 within a plurality of reservoirs 12 may be associated with a sensor means 14 to detect its water or fluid level independent of other reservoirs 12, which can instruct a microcontroller 25c to direct fluid or water flow to the particular reservoir 12 among the plurality of reservoirs 12. Water or fluid may be delivered via a series of water lines 16 coupled to a continuous water supply line 30. Delivery of fluid through the series of water lines is performed using a plurality of valves. The plurality of valves is encompassed within the term valve means 18. Similarly, the override shutoff feature may be tailored to each reservoir 12 independent of the additional reservoirs 12 to selectively shut off flow to a particular reservoir 12.

Referring to FIGS. 1-4 and 6, the reservoir 12 provides a structure, such as a cavity or concave surface, to retain one or more fluids such as water. A variety of reservoirs 12 known in the animal, veterinary and livestock arts may be adapted for use with the present invention. Nonlimiting examples include but are not limited to bowls, cups, dishes and troughs. Reservoirs 12 may be constructed using any suitable method desired by the user or as known in the material art to which it belongs, such as injection molding plastic. In other embodiments the reservoir 12 may be constructed using metal or metal alloy forming techniques, wood construction techniques and the like. Thus, the construction methodologies or materials of the reservoir 12 may include those used in the plastics industry, metal or metal alloy industry, woodworking industry and the like. Furthermore the reservoir 12 may be impregnated or include a coating to prevent bacterial growth, algae growth, fungal growth, viral growth and the like such as but not limited to MICROBAN (Microban Int'l, North Carolina). When used in larger scale such as with livestock facilities the reservoir 12 may be constructed as known or contemplated in the livestock arts. Modifications of the reservoir 12 to mount or associate a sensor means 14, circuit board 24, microcontroller 25c, visual indicator 26, continuous water supply line 16 power line 22 and the like are also encompassed within the present invention. As not limiting examples, the reservoir 12 may be adapted with apertures, throughbores, counterbores, protrusions, complementary surfacing and the like.

Figure 1:
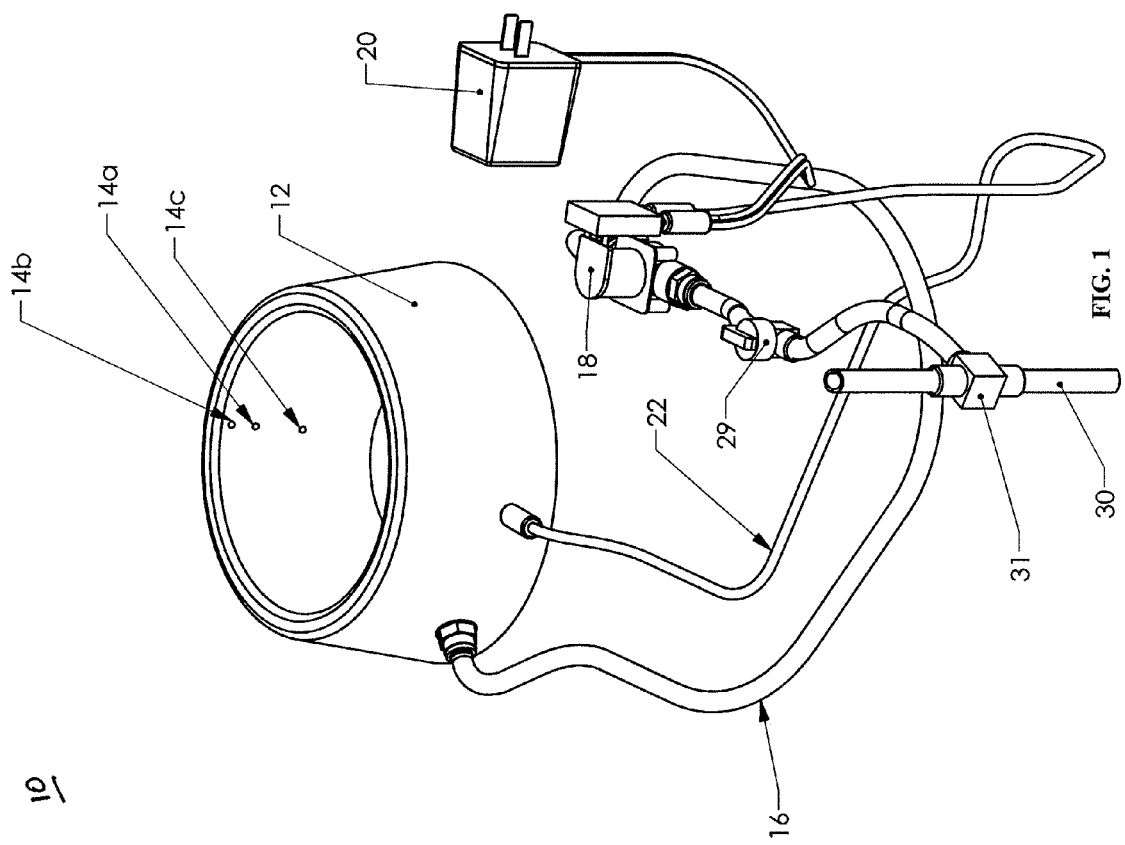
FIG. 1 depicts an elevated rear view of the smart water flow apparatus 10 including a reservoir 12 capable of retaining a fluid, the sensor means 14 including a start sensor 14a, stop sensor 14b and reference sensor 14c is positioned along the inner surface of the reservoir 12 such that when fluid fills the reservoir 12 the fluid will first contact the reference sensor 14c, then start sensor 14a then stop sensor 14b, fluid is introduced into the reservoir 12 by a continuous water supply line 16 and regulated via a valve means 18, which regulates flow from a continuous water supply. The apparatus 10 is powered by a power supply 20 and power is supplied via a power line 22.
Figure 2:
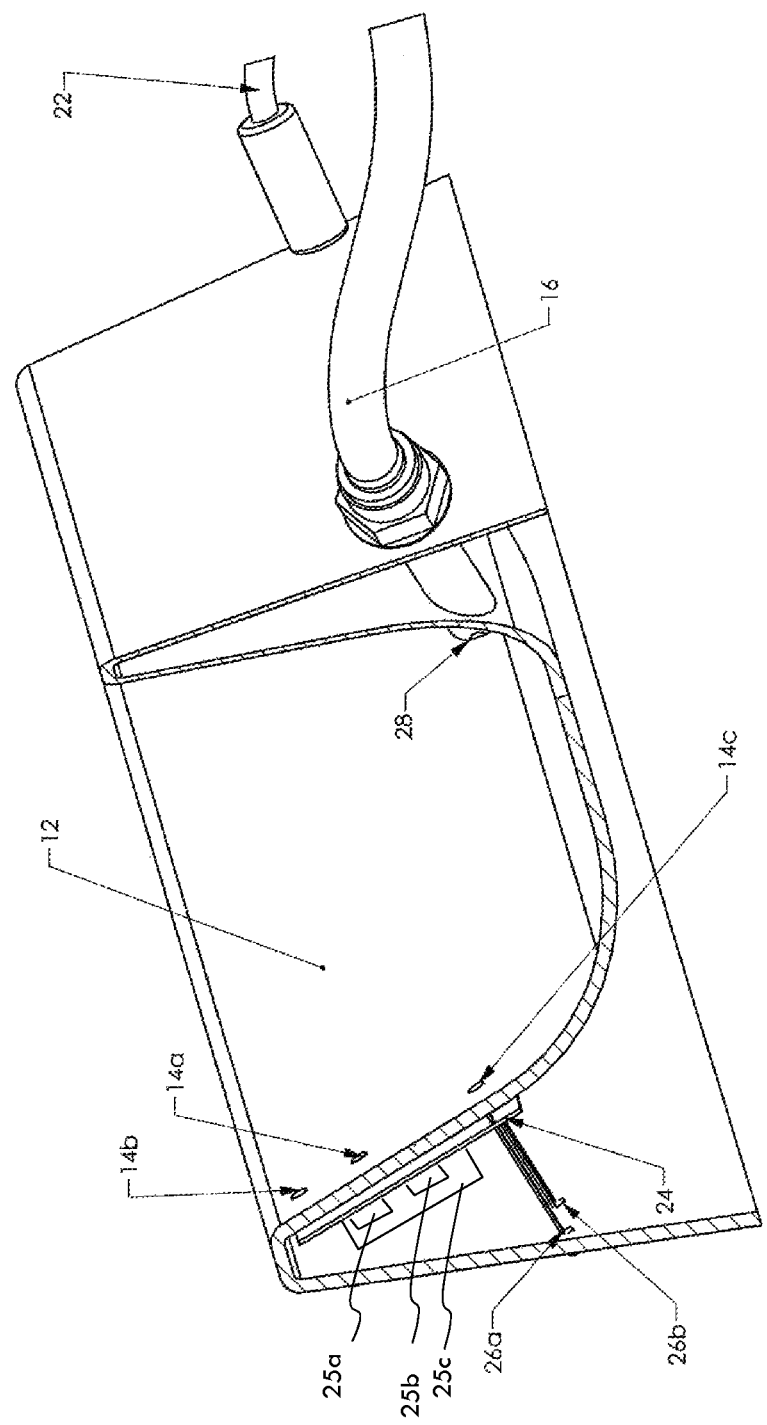
FIG. 2 depicts a partial cutaway view of the reservoir 12 demonstrating the electrical connection of the sensor means 14 with a circuit board 24 having a microcontroller 25c with memory 25a and timer 25b, the circuit board 24 being positioned within a dry portion of the reservoir 12. Also depicted is the electrical communication of circuit board 24 with visual indicators 26a and 26b provided in the form of LEDs, and the flow path of a fluid through the continuous water supply line 16 feeding into the reservoir 12 via an outlet port 28.
Figure 3:
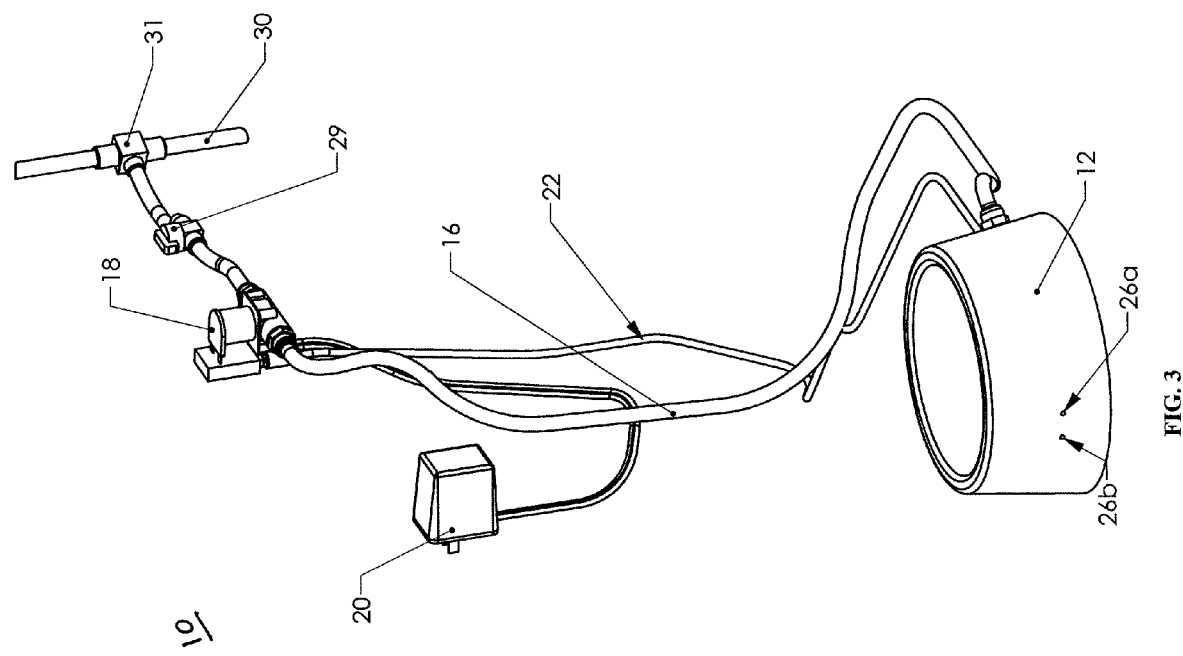
FIG. 3 depicts an elevated front view of the smart water flow apparatus 10 depicting the visual indicators 26a and 26b viewable from the outer surface of the reservoir 12. The continuous water supply line 16 and power line are provided in the rear of the apparatus 10.
Figure 4:
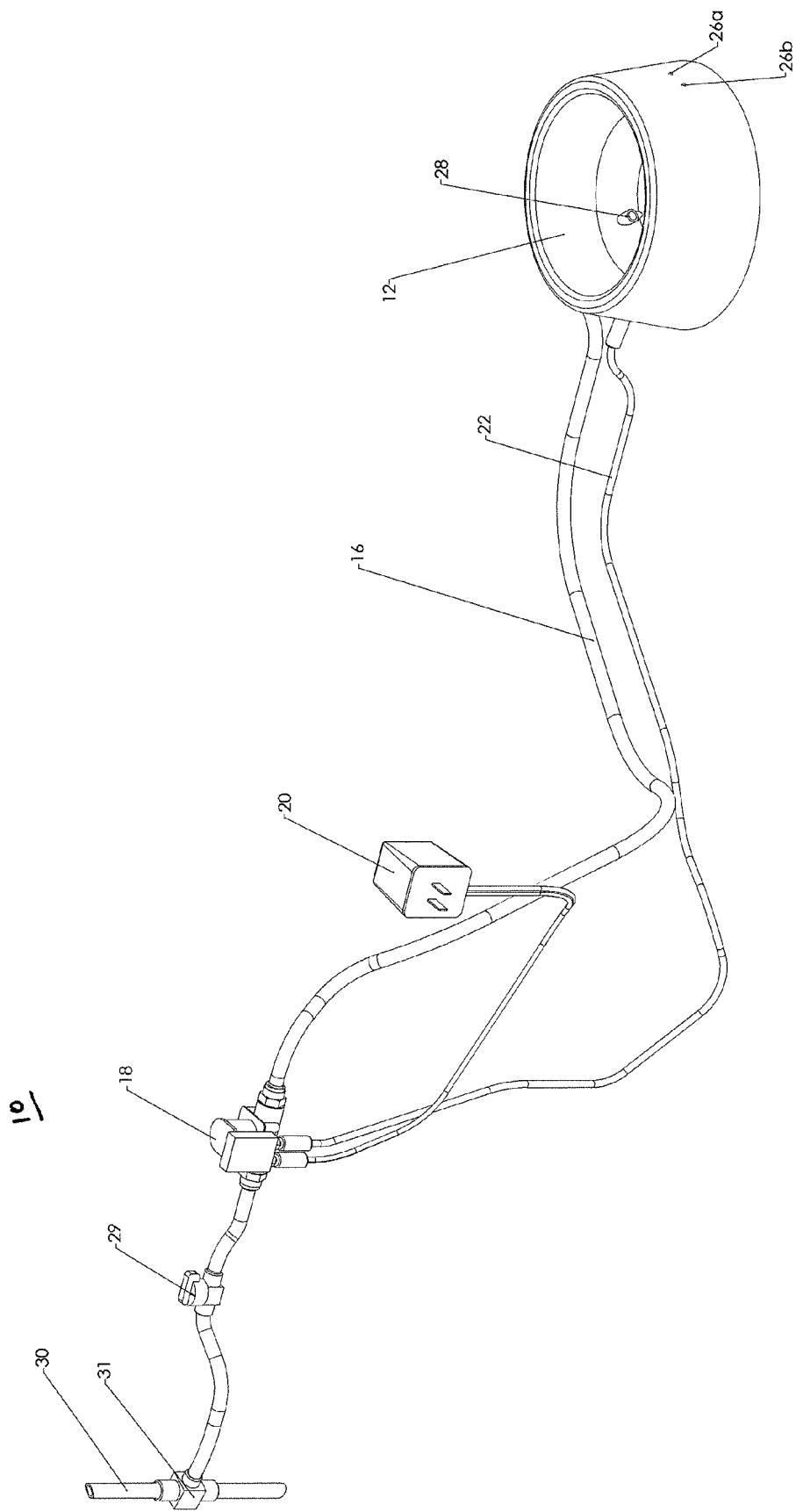
FIG. 4 depicts an elevated view of the smart water flow apparatus 10 and more clearly shows an outlet port 28 within the reservoir 12.

Referring to FIG. 2, in the preferred embodiment, the sensor means 14 is attached to or integrated into the reservoir 12 such that the reservoir cavity, that which retains the fluid, exposes a detecting region of the sensor means 14. The sensor means 14 may communicate and thus relay its information to the microcontroller directly or indirectly through a circuit board 24. In the preferred embodiment the microcontroller 25c, or circuit board 24 comprising the microcontroller 25c, is housed within the reservoir 12 such that it remains dry, even when the reservoir 12 is filled. Thus the microcontroller 25c and circuit board 24 are not directly exposed to the fluid but are protectively housed or spatially separated from the fluid. One or more apertures or a transparent region(s) may expose a portion of the sensor means 14 to the fluid held within the cavity of the reservoir 12. The microcontroller or circuit board 24 may be affixed to the inside of the reservoir 12 using any technique known or used in the electronics arts such as gluing, mating complementary surfaces and the like.

In some embodiments the reservoir 12 is provided remote from the valve means 18 or microcontroller. Remote reservoirs 12 may have particular utility in the livestock or veterinary arts where two or more reservoirs 12 are utilized. In these embodiments, the sensor means 14 is associated with, affixed to or removably connected to the reservoir 12 and is capable of transmitting information to the microcontroller 25c via appropriate communication cables or connections. Thus the sensor means 14 may transmit a signal in response to the presence or absence of a fluid from the reservoir 12 to the microcontroller 25c and the microcontroller 25c may intern provide instructions to the valve means 18 through a power line 22. In addition, the power line 22 may provide electrical power from the valve means 18 to the microcontroller 25c. Thus the power line 22 may allow the microcontroller 25c and sensor means 14 to operate using power routed from the power supply 20. Routing may occur by providing power from the power supply 20 to the valve means 18 and routing sufficient power from the valve means 18 to the microcontroller 25c or more specifically to the circuit board 24 then to devices connected to the circuit board 24. Thus the power line 22 should provide sufficient power to operate the microcontroller 25c and optionally the sensor means 14, visual indicators 26 and the like if required. Techniques for routing power through a plurality of devices are known in the electrical arts and are herein incorporated by reference in their entirety. The plurality of devices may be powered in series, parallel and the like as known in the electrical arts. Thus the present invention may be adapted to the particular user's reservoir 12 or may be interchanged between reservoirs 12. In these embodiments the water supply line 16 delivers water to the reservoir 12 whether remote or closely associated.

In other embodiments the apparatus 10 is provided as a single housed unit with all elements closely associated. However, in these embodiments the reservoir 12 may be detached for ease of cleaning then reattached to the water supply line 16. Similarly, the reservoir 12 may be interchanged such as to provide a larger or smaller reservoir 12. Detaching the reservoir 12 may send an additional signal to prevent flow of fluid from the valve means 18 or an additional shutoff valve may be provided. Alternatively, detaching the reservoir 12 may prevent the transfer of signal from a start sensor 14a to the microcontroller 25c or the microcontroller 25c to the valve means 18.

The sensor means 14 is operably connected to the microcontroller 25c and acts a detection system for relaying the status of the reservoir 12 to the microcontroller 25c. More specifically, the sensor means 14 detects the presence or absence of a desired fluid and signals the microcontroller 25c to provide corresponding instructions to the valve means 18. Thus the presence or absence of a fluid such as water results in transfer of instructions that open or close the valve means 18 and thus increase or decrease water flow to the reservoir 12. When using a plurality of reservoirs, preferably each reservoir 12 includes a sensor means 14. In this instance each sensor means 14 may communicate with a designated microcontroller 25c or a series of sensor means may communicate with a single microcontroller 25c or a combination thereof.

Sensors utilize a variety of technologies but frequently operate by providing a switching signal such as depressing a button, closing a circuit or opening a circuit. In the preferred embodiment the sensor means 14 includes at least two sensors 14a, 14b. One being a start sensor 14a, and another being a stop sensor 14b. In the preferred embodiment the stop sensor 14b is positioned above the start sensor 14a. In additional embodiments a reference sensor 14c or ground sensor is positioned below the stop sensor 14b and preferably below the start sensor 14a. A reference sensor 14c may indicate a reference level for initiating the timing of the programmable timing means, a subsequent fill time or may act to ground one or more circuits as known in the electrical arts. When fluid or water contacts the stop sensor 14b the water flow is halted by instructing the valve means 18 to close. When the start sensor 14a detects the presence of water but the stop sensor 14b does not, instructions are provided to open the valve means 18. In other embodiments flow of fluid or water is stopped when a closed circuit is formed between the stop 14b and start sensor 14a via electrical conduction through an electrically conductive media such as water. Programming the transfer of signal using sensors, microcontrollers and valves may be performed using techniques known in the electrical engineering arts and as discussed below.

The skilled artisan will appreciate that one of the key features of the apparatus is the redundant control function of the water solenoid valve. The primary control function of the valve means 18 (e.g. water solenoid valve) is handled by the start and stop sensors 14a, 14b. These sensors 14a, 14b signal the microcontroller 25c to apply various control algorithms used to turn on and off the water solenoid valve 18. If the stop sensor 14b were to accumulate enough dirt or contaminants such that it no longer made clean contact with the water in the bowl/reservoir 12, the stop sensor 14b would no longer be able to signal the microcontroller 25c to de-energize the water solenoid valve 18 to stop the water flow. This would result in the bowl/reservoir 12 endlessly overflowing. To prevent this from occurring, a secondary or redundant control function is implemented. This is accomplished by using a timer 25b to count how many seconds are required to fill the bowl/reservoir 12 the first time power is applied. This count, in seconds, is then multiplied by a factor greater than 1, such as 1.25, 1.5 or the like, to provide a margin for error, and stored as the programmed fill time, which is also referred to as an auto learned time. On any subsequent filling of the bowl/reservoir 12, a fill timer 25b is started and continuously compared to the programmed fill time. Both the stop sensor 14b (primary control) and the fill timer 25b versus programmed fill time (secondary control) are monitored, and either control has the ability to stop the water flow. The stop sensor 14b (primary control) will stop the water flow when the reservoir 12 is full. The fill timer 25b (secondary control) will stop the water flow when the fill timer 25b equals or exceeds the programmed fill time, or say 125% full. In order for the reservoir 12 to overflow, both control systems would have to fail, which is highly unlikely.

Turing back to sensors for use with the device, the skilled artisan will appreciate that a variety of sensors known in the electrical, mechanical and spectroscopic arts and may be used or adapted for use with the apparatus 10 and systems 200 of the present invention. Thus any sensor capable of detecting the presence or absence of a desired fluid such as water is encompassed within the presence invention. Moreover, the sensor means 14 may incorporate one or more of a variety of sensors. In one embodiment, the sensor means 14 incorporates a sensor that detects pressure. For example an increase in pressure, caused by the presence of a fluid, may press against and therefore activate a sensor. Furthermore a drop in pressure, such as by the absence of a fluid, may release pressure from the sensor or provide an alternative signal. Thus pressing or releasing the sensor would signify the presence or absence of a fluid. In another embodiment, the sensor utilized detects the presence or absence of anions or cations. In this embodiment the H+ or OH− from the auto-ionization of water may cause a detectable change in charge. In addition the dissociation of salts such as Na+ and Cl− may increase the conductivity of water. Thus the detection of cations or anions such as through the use of a cathode sensor or an anode sensor demonstrates the presence of water and the absence of such charge demonstrates the absence of water. These sensors are typically constructed from metal or metal alloy and are known in the chemical and electrical arts. In still another embodiment, the sensing means 14 includes one or more sensors that include a hygroscopic disc that swells in the presence of water and shrinks as it dries out. Thus, the swelling of the disk demonstrates the presence of water and the dried out configuration demonstrates the absence of water. The swelling of a hygroscopic disk may be used to press a button and its drying may release the button. In yet another embodiment an optical sensor detects at least one optical property in the surrounding vicinity and signals the microcontroller $25c$ accordingly. Thus changes in optical properties between air and a fluid can signal the microcontroller $25c$ to instruct the valve means 18 to open or close.

Fluids are delivered from a continuous water source to the reservoir 12 via the continuous water supply line 16. The continuous water supply line 16 is generally tubular and may be constructed from any material sufficiently strong to maintain flow from the water source to the reservoir 12. Examples of suitable materials include polymer plastic, polypropylene, metal, metal alloy, steel, galvanized steel or metal, copper and the like. The continuous water supply line 16 may feed into a series of water lines to further distribute fluid to a plurality of reservoirs using a plurality of valves.

The continuous water supply line 16 may have an adapter at one end for permanently or reversibly coupling the continuous water supply line 16 to plumbing fixtures such as pipes, water lines 30, spigots, hoses and the like. Thus installation of the apparatus to the continuous water source, such as city or locally supplied water, may involve the connection of the water supply line 16 to the continuous water supply using techniques known in the plumbing arts and may utilize a variety of connectors 31, sealants, O-rings, valves 29 and the like. At the opposing end, the continuous water supply line 16 may have a coupling for irreversibly or reversibly coupling the water supply line 16 to the reservoir 12 such as to enable the reservoir 12 to be removed or interchanged with a different reservoir 12. Techniques for coupling tubular structures or devices to tubular structures are well known in the art and are thus encompassed within the present invention. Couplings may include quick disconnect couplings such as those that disconnect via pushing a release button and pulling at least one of the connected structures. Naturally such couplings may include one or more O-rings to properly seal any connections. In further embodiments a one way valve is present within the coupling to prevent excessive water or fluid spillage upon disconnection.

In other embodiments, the continuous water supply line 16 is inserted through a through bore or aperture within the reservoir 12 and allowed to deliver fluid or water to the reservoir 12 through an outlet port 28 without physical connection to the reservoir 12. In other embodiments the continuous water supply line 16 is inserted through one or more through bores and the area around the water supply line 16 sealed such as through the use of a sealant to form an outlet port 28. In yet additional embodiments the continuous water supply line 16 is draped over the reservoir 12 or held in place over the reservoir 12 to permit delivery of fluid to the reservoir 12. The adapter may be a quick connect or quick disconnect coupling.

The flow of fluid or water is regulated via the valve means 18. The valve means 18 may receive its instructions from a microcontroller $25c$ operably connected to the sensor means 14. Valves typically operate by opening, closing or partially obstructing passageways by the manipulation of disks or rotors. The valve means 18 may regulate flow into the reservoir 12 by opening, closing or partially obstructing the water supply line 16 at either end or within a central region depending on the user's needs. The valve means 18 may fluidly connect to the continuous water source and continuous water supply line 16 and thus regulate flow of fluid into the continuous water supply line 16. Thus, the positioning of the valve means 18 is nonlimiting so long as the flow of fluid may be regulated. The valve means 18 may be a single valve or multiple valves in series or parallel. Depending on the user's needs, the valve means 18 may include a one way valve, such as to prevent backflow or a two or three way valve to permit directional flow of fluid or water to one or more of a plurality of reservoirs 12. The valve means 18 is intended to be non-limiting and may be a mechanical valve such as those found in the plumbing arts or preferably an electromechanical valve.

In the preferred embodiment the valve means 18 is a solenoid valve. A solenoid valve is an electromechanical valve controlled by running or stopping an electrical current through a solenoid, which in essence is a coil of wire, thus changing the state of the valve. Thus the solenoid valve allows easy manipulation of flow by controlling the presence or absence of current such as by using a microcontroller $25c$ and logic function. Often a spring is used to hold the valve closed and the delivery of an appropriate electrical signal such as current opens the valve means 18. Stopping the flow of current or opening a circuit may allow the spring to close the valve means 18. Solenoid valves offer fast and reliable switching and may incorporate plunger type actuators, pivoted-armature actuators, rocker actuators and the like.

The microcontroller $25c$ is in essence, a computer on a chip. The microcontroller $25c$ is typically positioned on a circuit board 24 as known in the electrical arts along with appropriate electrical circuits, conductors, nonconductors, traces and the like. In addition to arithmetic and logic elements of a general purpose microprocessor, the microcontroller $25c$ usually includes features such as read only and read write memory $25a$ and input/output interfaces. By reducing the size, cost and power consumption compared to a traditional microprocessor, memory and input/output devices, microcontrollers $25c$ make it more economical to electronically control processes. However, one skilled in the art would also recognize the present invention may utilize a microprocessor with substitutable peripheral devices such as memory $25a$, timers $25b$ and the like, which is intended to be encompassed within the term microcontroller. Thus as used in the present invention, the term microcontroller refers to the microprocessor and any needed peripherals, inputs/outputs to perform the desired functions, such as measuring or monitoring time, recording such measurements in memory $25a$, comparing measurements, receiving electrical signals from the sensor means 14 and sending instructions to the valve means 18. Thus, the microcontroller used with the present invention may automatically control the opening and closing of the valve means 18 such as by directing or preventing electrical current to the valve means 18 in response to signal received by the sensor means 14 and closing the valve means 18 in response to the expiration of a programmed time.

In the typical operation of the apparatus 10 of the present invention, the microcontroller $25c$ instructs the valve means 18 to open or remain open via a logic function, which is operable when the start sensor $14a$ detects the presence of water (or desired fluid) or if the stop sensor $14b$ detects the absence of water (or desired fluid). Similarly, if the stop sensor $14b$ detects the presence of water, the microcontroller $25c$ instructs the valve means 18 to close thereby preventing overflow of water. In addition, the microcontroller $25c$ may instruct the valve means 18 to close upon the expiration of a programmed time. Thus, the microcontroller $25c$ concurrently monitors the amount of time that the valve means 18 remains open and may shutoff or instruct the valve means 18 to close upon expiration of the programmed time independent of a signal from the sensor means 14. This monitoring is referred to as the subsequent fill time. The subsequent fill time may be determined by monitoring the time it takes to fill the reservoir from the reference sensor 14c to the stop sensor 14b. The override feature permits the apparatus 10 of the present invention to prevent spillage due to a malfunctioning sensor or if the reservoir 12 has been tipped over such as by a pet, livestock weather condition and the like. Thus the override feature permits the apparatus 10 to shut off fluid flow if the programmed time expires prior to the fluid reaching the stop sensor 14b. The subsequent fill time may be recorded in memory 25a for future analysis or may be overwritten each time with a new subsequent fill time. In the preferred embodiments the instruction to stop fluid flow is given priority over an instruction to start or continue water flow.

When using a plurality of reservoirs 12 it may be desirable to utilize a plurality of sensor means 14 each associated with one reservoir 12 and operably connected to a microcontroller 25c for instructing flow through a series of water lines. Thus each of a plurality of microcontrollers 25c may be operably connected to a sensor means 14 and capable of instructing the opening or closing at least one of a plurality of valves. In other embodiments the sensor means 14 from at least two reservoirs 12 are operably connected to a single microcontroller 25c.

In the preferred embodiment, the microcontroller 25c is capable of recording a programmed time into memory 25a, monitoring the time that the valve means 18 remains open in a subsequent filling, comparing these times and upon expiration of the programmed time, instructing the valve means 18 to close. Thus the apparatus 10 is capable of storing a programmed time, which refers to the time required to fill the reservoir 12 and capable of monitoring the time in which fluid is delivered during regular operation, which is the subsequent fill time. These times are compared to ensure the subsequent fill time does not exceed the programmed time to prevent significant flooding or significant spillage of the reservoir's 12 contents. These functions are performed using logic functions and programming techniques known in the electrical or computer arts.

In order to be used with a variety of water pressures or to provide an override shutoff feature, the apparatus 10 of the present invention measures and records the amount of time in which it takes to fill the reservoir 12 from a dry or nearly dry state to the desired level or volume, such as once the stop sensor 14b is reached. Thus, the amount of time the valve means 18 remains open during the operation of filling the reservoir 12 may be measured and recorded for later comparison in a subsequent filling. In alternative embodiments the programmed time refers to the time it takes for the fluid to rise from the reference sensor 14c to the stop sensor 14b. Thus the microcontroller 25c of the present invention includes a programmable timer 25b either integrated with the microcontroller 25c or in communication with the microcontroller 25c. The programmable timer 25b may be a mechanical timer 25b but preferably operates via integrated circuits and/or digital logic as known in the electrical and computer arts. Similarly, the programmable timing timer 25b may be implemented by loaded software as known in the electrical and computer arts.

Programming the programmable timer 25b is typically performed at start up of the apparatus 10 or if the apparatus 10 is to be reset. The programming typically occurs by accessing a set up program loaded in memory 25a. Programming may involve steps including but not limited to, providing the reservoir 12 in a dry or unfilled state, instructing the opening of the valve means 18, determining or measuring the time it takes to fill the reservoir 12 to the appropriate or desired level, such as until the stop sensor 14b is reached, and storing in memory 25a the determination or measurement for later comparison. The time it takes to fill the apparatus 10, such as until the stop sensor 14b is reached, is referred to as the programmed time. The subsequent fill time may be determined by the difference in time from a fluid reaching the reference sensor 14c to the stop sensor 14b. The programmed time is compared to the subsequent fill time each time fluid is provided to the reservoir 12 to determine whether the signal received from the sensor means 14 should be overridden and thus the flow of fluid halted. One skilled in the art would now recognized that in order to monitor the fill time and thus define a cutoff or override feature, the valve means 18 may be operated by instructions independent of the fluid level, such as the user pressing a button in communication with the valve means 18 to permit or restrict fluid flow and the like. In some embodiments the programmed time must be programmed each time the apparatus is turn from off to on or when the apparatus loses power.

In the preferred embodiments, the apparatus 10 of the present invention operates by transfer of electrical signal. Thus, the preferred embodiments will require a power source such as a power supply 20. The power supply 20 may be adapted from current technologies such as AC/DC converters such as those that convert 120 volts AC to 12 volts DC and the like. In other embodiments the power supply 20 is a battery pack. The power supply 20 may be housed together with one or more elements of the present invention or may be housed or provided separately. A coaxial connector from a power supply 20 or power supply line 22 may plug into a jack associated with the microcontroller or mounted on a printed circuit board 24 containing the microcontroller 25c and the like. Thus power may be delivered from the power supply 20 via one or more power supply lines 22. Power may also be routed through devices such as the valve means 18, circuit board 24, microcontroller 25c and the like. Such techniques for providing sufficient power are well known in the electrical arts and are herein incorporated by reference in their entirety.

Power outage detection is preferred for instances when the power source may be removed and then restored. When the power is restored, the apparatus 10 will enter the auto learn mode, and attempt to measure the time required to fill the reservoir 12. Since the reservoir 12 is already full, a fill time of zero seconds would be erroneously recorded, which would prevent subsequent fills from occurring. To prevent this, prior to entering the auto learn mode, the software performs a power outage detection by checking to see if the bowl/reservoir 12 is full at power up. If it is, the software records a default fill time of three minutes, which is an average fill time derived by filling several bowls at different water pressures. Normal operation of the apparatus 10 resumes, and a power outage detected LED indication is given. This LED indication lets the user know that the apparatus 10 is using a default fill time, and not an auto learned fill time. The remedy for this is to empty the reservoir 12 and cycle the power as soon as convenient, allowing the apparatus 10 to auto learn the fill time.

As eluded to above, in various embodiments, the present invention may include visual indicators 26, which offer a variety of display options for the user. The visual indicators 26 provide an indication which provides information regarding the status of the apparatus. Examples of visual indicators include any used in appliances or known in the electrical arts, such as low wattage lights. In some examples a series of LEDs (light emitting diodes) are used. The series of LEDs may include the same color or different colors and may include visual indicia above or below at least one of the LEDs. The following is a non-limiting example of an embodiment incorporating two LEDs. In this example, there are two LEDs, red and green, which provide indications as follows:

| Indication | Red | Green |
| --- | --- | --- |
| Power Off | Off | Off |
| Power On | On | Off |
| Water Off | On | Off |
| Water On | On | On |
| Auto Learn Mode | On | Flashing |
| Power Outage Detected | Flashing | On |
| Time Out Error | Flashing | Flashing |

Referring to the above indications, the power on or power off indication refers to whether the device 10 is turned on or off. The water on or water off indication refers to whether the valve means 18 is in an open position or in a closed position and thus whether fluid is being delivered. The learn mode indication refers to the apparatus 10 is in or ready to initiate programming of the programmable timer 25b. The power outage detected indication is a condition when upon activation or turning on the power, the microcontroller 25c determines the reservoir 12 is already full, such as in the case where the stop sensor 14b detects the presence of fluid or water. The time out error indication is a condition where after the initial fill time is programmed, a subsequent fill is not detected by the stop sensor 14b and the programmed fill time is reached. The logic function of the microcontroller 25c will terminate water flow by instructing the valve means 18 to close and declare an error condition.

In the preferred embodiment the time out error indication discussed above will cause the logic function of the microcontroller to prevent or prohibit water flow via instructing the valve means 18 to remain closed and providing the appropriate visual indication on the LED indicators. This error will require operator intervention to clear. If the time out error occurred due to a dirty sensor, the sensor must be cleaned. In further embodiments, the power must be turned off or the device unplugged then turned on again to restart the process.

There is a condition envisioned that would be best avoided, where a pet is drinking while a normal fill cycle is occurring. The problem is that if the pet drinks fast enough and long enough to prevent the water level from rising to the stop sensor 14b, the auto learned fill time could expire, causing the bowl or reservoir 12 to shut down in an error condition. The most likely scenario for this condition to occur would happen after the pet walks away with the water level just above the start sensor 14a. When the pet, or another pet returns and starts drinking, the water level quickly drops below the start sensor 14a, the normal fill cycle begins, and competes with the drinking pet for fill time.

To prevent this situation from occurring, a four minute time delay is started when the water level drops below the start sensor 14a. When that four minute time delay expires, a normal fill cycle is allowed to occur. This time delay allows the pet to drink as much as desired and walk away, or to drink the bowl dry and walk away.

Prior to the addition of the delay of normal fill cycle function above, the normal fill cycle would fill the bowl from midway (location of the start sensor 14a) to the top (location of the stop sensor 14b). This normal fill cycle volume of water constituted approximately one half of the total volume of water the bowl/reservoir 12 can hold, and is inherently less than a full bowl of water, which is the auto learned fill time. With the auto learned fill time always greater than the normal fill cycle time, a margin for error is maintained. This margin for error initially compensated for degradation of the water pressure with time, which would cause a normal fill cycle to take longer than when the bowl first auto learned.

After the addition of the delay of normal fill cycle function, as outlined above, it is possible for the normal fill cycle to be required to fill an empty bowl. At that point, the normal fill cycle time would equal the auto learned fill time, which could cause a time out error. Additionally, if the water pressure has degraded since the auto learn took place, the normal fill cycle time would exceed the auto learned fill time, definitely causing a time out error.

To prevent this situation from occurring, when power is first applied the software enters the auto learn mode and times the filling of the bowl. This time, which used to directly be the auto learn fill time, is now multiplied by 1.25 before storing as the auto learned fill time. At 125% of the empty bowl fill time, the auto learned fill time is inherently greater than a normal fill cycle fill time of an empty bowl/reservoir 12, as described above, ensuring a comfortable margin for error.

The apparatus of the present invention may be provided as a kit including the apparatus 10 and an installation means for installing the continuous water supply line 16 to the appropriate water source such as city, local or state water supply as well as instructions for such installation. Thus the kit may include a variety of nuts, bolts, adapters, jacks and the like known in the plumbing arts for installation to household or a residence's water pipes or water line.

Example 1

Figure 5:
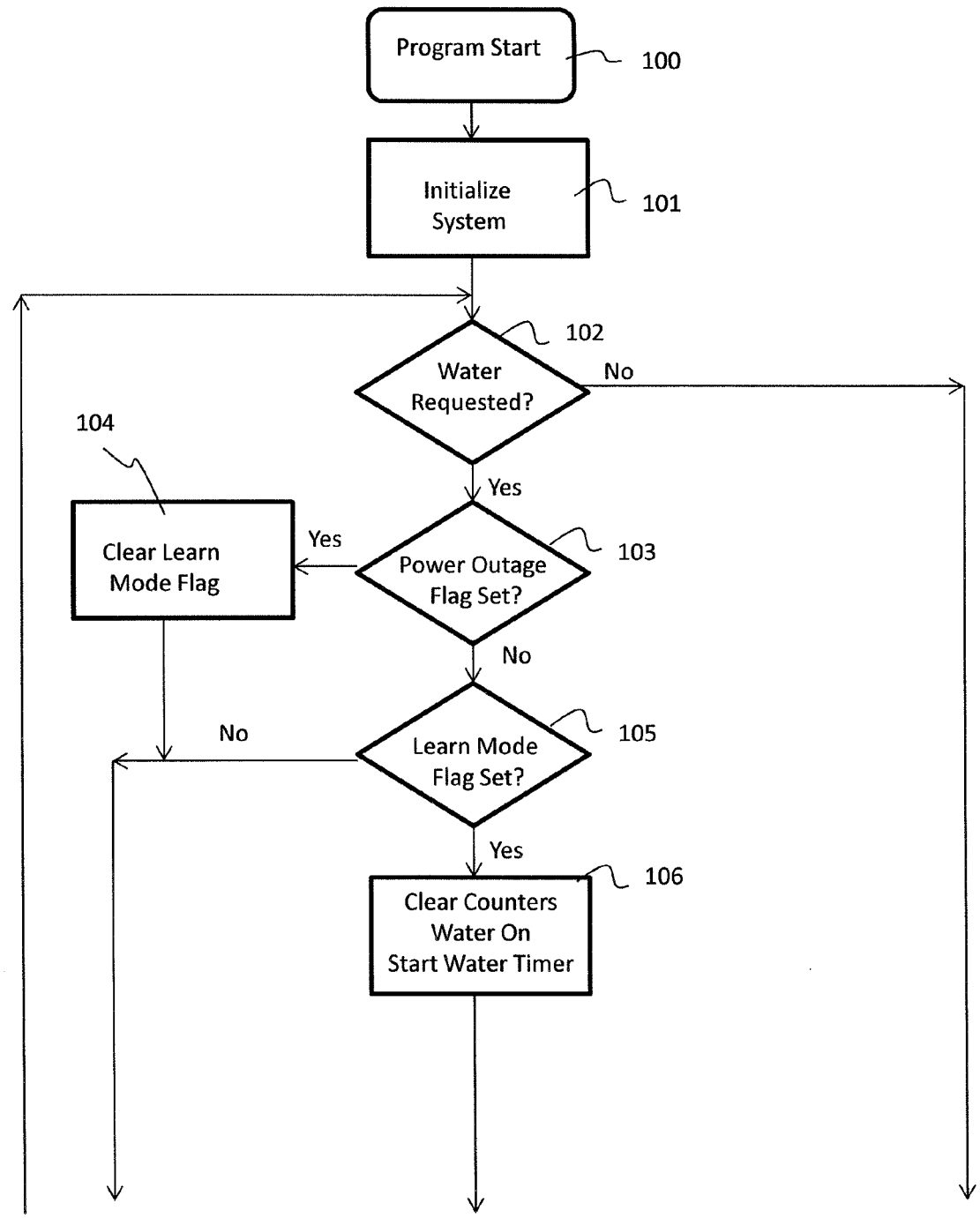
FIG. 5 is a flow chart depicting an exemplary method of operation of the device through the use of loaded software.
Figure 5:
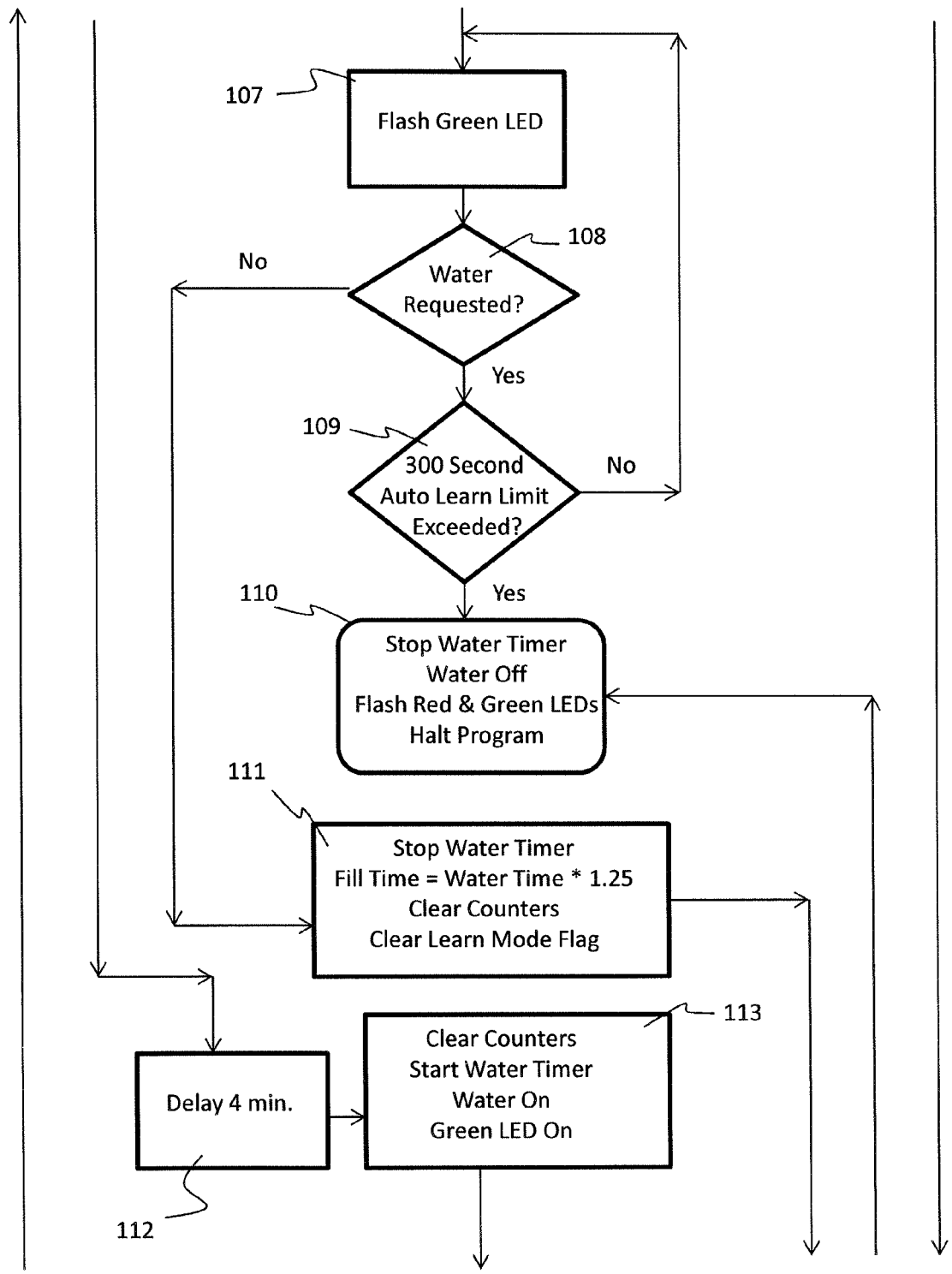
Figure 5:
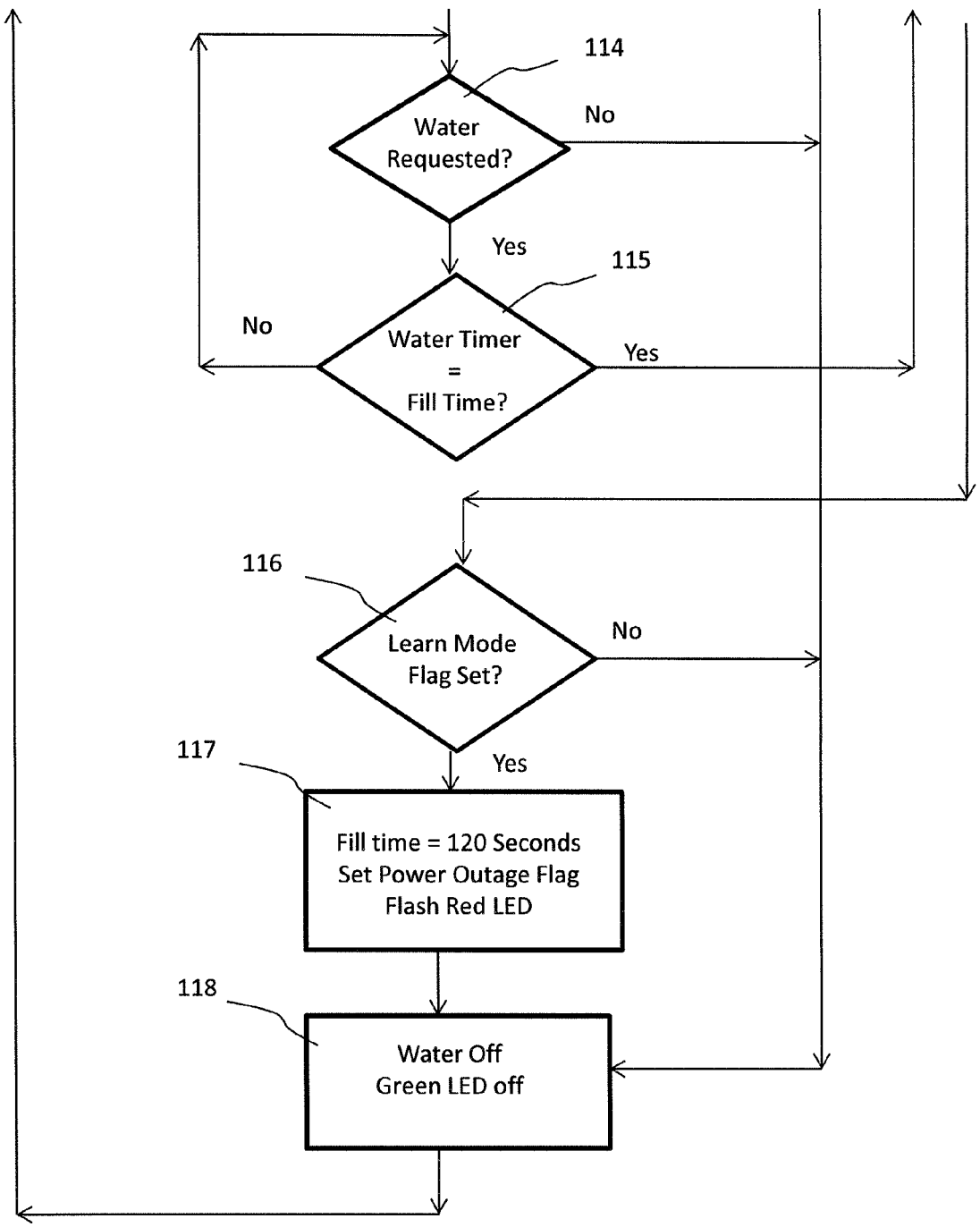

Measurement of Initial Flow Time, Subsequent Fill Time and their Comparison to Provide a Fill System with Redundant Protective Features With reference to a preferred method depicted in FIG. 5, an exemplary program control starts at 100 and initializes the hardware and software at 101. At 102 the Start Sensor is read to determine if water is requested. If water is not requested, control transfers to 116 where the Learn Mode Flag is tested. If the Learn Mode Flag is not set, control transfers to 118 where water is ensured to be off as well as the green LED, and the program restarts after System Initialization. If the Learn Mode Flag is set then a Power Outage has occurred or the bowl was full at startup, and control transfers to 117, where the Programmed Fill Time is set to a default value of 120 seconds, the Power Outage Flag is set, and the red LED is flashed. Control then transfers to 118 where water is ensured to be off as well as the green LED, and the program restarts after System Initialization.

Back at 102, if water is requested, control transfers to 103 where the Power Outage Flag is tested. If the Power Outage Flag is set then the Learn Mode must not occur, so control transfers to 104 where the Learn Mode Flag is cleared. If the Power Outage Flag is not set, control transfers to 105 where the Learn Mode Flag is tested. If the Learn Mode Flag is not set, control joins the output of 104 and transfers to 112, where 4 minutes are delayed prior to transferring control to 113 where a Normal Fill Cycle begins by clearing the counters, starting the Water Timer, turning on the water and the green LED.

Back at 105, if the Learn Mode Flag is set, control transfers to 106 where the Auto Learn Mode begins by clearing the counters, turned on the water, and turning on the water timer. Control transfers to 107 where the green LED is flashed. Control transfers to 108 where the Stop Sensor is read to determine if water is still requested. If water is still requested, control transfers to 109 where the 300 second Auto Learn Limit check is made. If the 300 second Auto Learn Limit has not been reached control transfers to 107 where the Auto Learn Mode continues. If the 300 second Auto Learn Limit has been reached then a Time Out Error has occurred, and control transfers to 110, where the Water Timer is stopped, the water is turned off, the red and green LEDs are flashed, and program control stops.

Back at 108 if water is no longer requested then the Auto Learn Mode has successfully completed, and control transfers to 111 where the Water Timer is stopped, multiplied by 1.25, and stored in memory as the Programmed Fill Time. The counters are cleared and the Auto Learn Mode Flag is cleared. Control transfers to 118 where water is ensured to be off as well as the green LED, and the program restarts after System Initialization.

Back at 113 where a Normal Fill Cycle has begun, control transfers to 114 where the Stop Sensor is read to determine if water is still requested. If water is no longer requested, program control transfers to 118 where water is ensured to be off as well as the green LED, and the program restarts after System Initialization. If water is still requested, control transfers to 115 where the Water Timer is compared to the Programmed Fill Time to ensure a flood does not occur in the event of a dirty Stop Sensor. If the Water Timer does not equal the Programmed Fill Time, control transfers back to 114 where the Normal Fill Cycle continues. If the Water Timer does equal the Programmed Fill Time then a Time Out Error has occurred, and control transfers to 110, where the Water Timer is stopped, the water is turned off, the red and green LEDs are flashed, and program control stops.

While the above description provides a variety of embodiments, the disclosure is intended to demonstrate nonlimiting adaptations that one skilled in art would consider upon reviewing the present disclosure. Thus various adaptations whether specifically disclosed or obvious to one skilled in the art upon reading the provided disclosure are intended to be encompassed herein. The present invention is not intended to be limited by scale or particular use.

What is claimed is:

1. A smart water flow apparatus comprising:
   a) an open top reservoir capable of retaining a fluid, said reservoir comprising a sensor mechanism comprising a start sensor and a stop sensor each capable of detecting the presence or absence of said fluid;
   b) a continuous water supply line capable of fluid communication with a continuous water source, wherein said communication allows continuous delivery of water to said reservoir;
   c) a valve capable of opening and closing, further wherein when in the open position said valve permits flow of said water from said continuous water supply line to said reservoir and when in the closed position said valve prevents flow of said water to said reservoir;
   d) a microcontroller operably connected to said sensor mechanism and said valve, said microcontroller comprising memory and executable programming comprising a timer that times the flow of fluid, further wherein said microcontroller stores in said memory a programmed time and compares a subsequent fill time to said programmed time, characterized in that said microcontroller calculates said programmed time by measuring a flow time between an unfilled state and said stop sensor then multiplying said measured flow time by a margin for error and said subsequent fill time is measured in subsequent fillings, further wherein said microcontroller instructs the closure of said valve if said programmed time is reached or if said subsequent fill time equals or exceeds said programmed time, further wherein said microcontroller delays opening of said valve after a programmed time delay initiated after receiving a start signal from said sensor mechanism; and
   e) a power supply.

2. The smart water flow apparatus according to claim 1, wherein the reservoir is a bowl.

3. The smart water flow apparatus according to claim 1, wherein said reservoir is a trough.

4. The smart water flow apparatus according to claim 1, wherein said stop sensor is positioned above said start sensor, said sensor mechanism further comprising a reference sensor positioned below said start sensor, wherein said reservoir is dry or a water level is below said reference sensor in an unfilled state and said flow time for calculating said programmed time is measured from below or at said reference sensor to said stop sensor, further wherein said subsequent fill time is measured between said start sensor and said stop sensor.

5. The smart water flow apparatus according to claim 1, wherein said valve is an electromechanical valve or a solenoid valve.

6. The smart water flow apparatus according to claim 1, wherein said valve is a mechanical valve.

7. The smart water flow apparatus according to claim 1, wherein said microcontroller is positioned at or on said reservoir.

8. The smart water flow apparatus according to claim 1, wherein said microcontroller is positioned remote from said reservoir.

9. The smart water flow apparatus according to claim 1, wherein said programmed time is programmed using the following steps:
   a) providing the reservoir in said initial unfilled state; and
   b) opening said valve;
   wherein the microcontroller determines the time it takes to fill said reservoir and stores in said memory said determination as said programmed time.

10. The smart water flow apparatus according to claim 1, wherein said subsequent fill time is overwritten upon each subsequent filling.

11. The smart water flow apparatus according to claim 1, wherein said power supply is a battery or an AC to DC power supply converter.

12. The smart water flow apparatus according to claim 1, further comprising a visual indicator capable of displaying one or more indications wherein at least one indication is a learning mode, wherein the learning mode is characterized as measuring flow time and calculating the programmed time.

13. The smart water flow apparatus according to claim 12, wherein a second indication is a power outage detected indication, which indicates the apparatus is operating under a default fill time and not the programmed time.

14. The smart water flow apparatus according to claim 13, where said visual indicator comprises two light emitting diodes.

15. A smart water flow kit comprising:
   a) the smart water flow apparatus according to claim 1;
   b) an installation supplies for installing said water supply line to a continuous water source; and
   c) instructions for installing and optionally assembling or connecting two or more elements of the water flow apparatus.

16. The smart water flow apparatus according to claim 1, wherein said programmed time delay is four minutes.

17. The smart water flow apparatus according to claim 1, wherein said microcontroller is programmed to measure flow time for calculating said programmed time at start up or restart of said apparatus only if said sensor mechanism detects the absence of fluid, wherein the presence of fluid at start up or reset initiates a default time for comparison with said subsequent fill time.

18. The smart water flow apparatus according to claim 17, wherein said default time is three minutes.

19. The smart water flow apparatus according to claim 1, wherein subsequent fill times are stored in said memory for future analysis.

20. A smart water flow system comprising:
   a) a plurality of open top reservoirs, each associated with a sensor mechanism capable of detecting a presence or absence of a fluid, said sensor mechanism comprising a start sensor and a stop sensor;
   b) a continuous water supply line fluidly connected to a continuous water source at one end and a series of water lines at an opposing end, said series of water lines fluidly connected to said plurality of reservoirs;
   c) a valve system comprising a plurality of valves capable of regulating the flow of fluid into each of said plurality of reservoirs;
   d) a plurality of microcontrollers operably connected to said sensor mechanisms and capable of instructing an opening or closing of said plurality of valves, said microcontrollers comprising memory and executable programming comprising timers that time flow of said fluid, further wherein said microcontrollers store in said memory a programmed time and compare a subsequent fill time to said programmed time, characterized in that said microcontrollers calculate said programmed time by measuring flow time to said stop sensor from an initial unfilled state then multiplying the measured flow time by a margin for error and said subsequent fill time is measured in subsequent fillings, further wherein said microcontroller instructs the closing of at least one of said plurality of valves if said programmed time is reached or if said subsequent fill time exceeds said programmed time for the corresponding reservoir, further wherein said microcontrollers delay opening of said valves for a programmed time delay after receiving a start signal from said sensor mechanism; and
   e) a power supply.

* * * * *